(12) United States Patent
Wheeler

(10) Patent No.: US 11,498,311 B2
(45) Date of Patent: Nov. 15, 2022

(54) BARRIER MATERIAL

(71) Applicant: ASG ENTERPRISES (AUST) PTY. LTD, Subiaco (AU)

(72) Inventor: Daniel Wheeler, Glenroy (AU)

(73) Assignee: ASG ENTERPRISES (AUST) PTY. LTD, Subiaco (AU)

(*) Notice: Subject to any disclaimer, the term of this patent is extended or adjusted under 35 U.S.C. 154(b) by 215 days.

(21) Appl. No.: 16/608,622

(22) PCT Filed: Apr. 26, 2018

(86) PCT No.: PCT/AU2018/000062
§ 371 (c)(1),
(2) Date: Oct. 25, 2019

(87) PCT Pub. No.: WO2018/195584
PCT Pub. Date: Nov. 1, 2018

(65) Prior Publication Data
US 2020/0331232 A1    Oct. 22, 2020

(30) Foreign Application Priority Data

Apr. 26, 2017  (AU) .................. 2017901509

(51) Int. Cl.
*B32B 3/24* (2006.01)
*B32B 5/26* (2006.01)
(Continued)

(52) U.S. Cl.
CPC .............. *B32B 5/26* (2013.01); *B32B 3/04* (2013.01); *B32B 5/024* (2013.01); *B32B 5/028* (2013.01);
(Continued)

(58) Field of Classification Search
CPC .................. E04G 21/32; E04G 5/12
See application file for complete search history.

(56) References Cited

U.S. PATENT DOCUMENTS 3,446,251 A * 5/1969 Dow .................. D03D 9/00
139/383 R
4,020,209 A * 4/1977 Yuan .................. D03D 25/00
442/204

FOREIGN PATENT DOCUMENTS

| WO | 2012/094897 A1 | 7/2012 |
| WO | 2012/145783 A1 | 11/2012 |
| WO | 2015/000027 A1 | 1/2015 |

OTHER PUBLICATIONS

International Search Report issued in International Application No. PCT/AU2018/000062 dated Aug. 7, 2018, 3 pages.

* cited by examiner

Primary Examiner — William P Watkins, III
(74) Attorney, Agent, or Firm — Mauriel Kapouytian Woods LLP; Andrew A. Noble

(57) ABSTRACT

A barrier material for a containment system comprising: a first portion of polymeric material having an open structure defined by a plurality of small openings to function as a fine screen, the first portion of polymeric material being formed from a plurality of fibrous materials and being configured to form a static structure having a display surface; and a second portion attached to a second surface of the first portion, the second portion having an open structure defined by a plurality openings to function as a reinforcing member for the first portion; wherein the display surface of the first portion is configured to receive and retain a printed image thereon.

7 Claims, 6 Drawing Sheets

(51) Int. Cl.
*B32B 3/04* (2006.01)
*B32B 5/02* (2006.01)
*E04G 5/12* (2006.01)
*E04G 21/32* (2006.01)
*G09F 23/00* (2006.01)
*E04G 5/14* (2006.01)
*B32B 3/26* (2006.01)

(52) U.S. Cl.
CPC ............ *E04G 5/12* (2013.01); *E04G 21/3266* (2013.01); *G09F 23/00* (2013.01); *B32B 3/266* (2013.01); *B32B 2262/02* (2013.01); *B32B 2459/00* (2013.01); *E04G 2005/148* (2013.01); *Y10T 428/24273* (2015.01)

BARRIER MATERIAL

RELATED APPLICATION(S)

This application is a U.S. National Phase application under 35 U.S.C. § 371 of International Application No. PCT/AU2018/000062 filed 26 Apr. 2018, which claims priority from Australian provisional patent application No. 2017901509 filed 26 Apr. 2017, the entire contents of which are incorporated herein by reference.

FIELD OF INVENTION

The present invention relates generally to a barrier material for use in containment applications, and in particular, to a barrier material for use in containment applications on scaffolding or the like and which has a surface suitable for receiving and retaining a printed work, logo, graphic thereon.

BACKGROUND OF THE INVENTION

Containment materials for forming temporary and/or semi-permanent barriers are well known. Such materials typically comprise interlocking wires or links or woven sheets of material that can be rolled into a bundle and simply unrolled and erected to form a barrier. The materials may be constructed to be self-supporting such that they are able to be used in a vertical manner to form a fence or vertical barrier, or they may be attached to an existing structure which supports the material in a working manner.

In the building constructing industry, barrier materials for use with scaffolding structures function as a containment means and provide a significant role in workplace safety. In situations where scaffolding systems are to be employed about a façade and external walls of a building, it is a general requirement that a barrier material be employed with the scaffolding structure to eliminate or minimize the risks of objects falling from the scaffolding and posing a risk to workers on the site and the general public passing by the site. Such containment systems also function to retain dust and other debris within the scaffolding system and some may also perform a fall arrest function to prevent workers from falling from the scaffolding.

As most scaffolding structures are temporary structures, most containment systems used with the scaffolding systems are also temporary in nature, requiring assembly and disassembly to the scaffolding structure. For this reason, a variety of different materials have been proposed for use as containment screens. The choice of materials may depend upon the specific application required and can vary from a plastic or wire mesh, shade cloth, timber, plywood as well as metal and plastic sheeting. If a material such as timber or metal sheeting is used, consideration needs to be given to the additional wind loading that will be applied to the scaffolding structure once the containment system is assembled thereto. For this reason, materials which are traditionally open in structure have proven popular as screening materials as they allow a large degree of wind to pass therethrough, thereby reducing the wind loading on the scaffolding structure. As such, conventional shade cloth material and/or wire/plastic grid material have proven the most popular materials for use as a containment material largely due to their ability to allow a large amount of air to penetrate through the material when employed.

Shade cloth or mesh is typically formed from inter-woven this strands of plastic material to form a type of netting that has a degree of strength due to the ability of the individual strands to move together upon the application of a force applied thereto. For this reason, the material is air permeable and relatively light weight such that it can be supplied in roll of continuous sheet to the building site to be erected about the scaffolding. Such material is also typically used together with a netting material, such as a wire or plastic grid, so as to provide reinforcement and strength to the combined material.

Whilst such materials have proven effective in providing a lightweight and relatively air permeable solution for containment systems, due to the open weave nature of the material, individual strands of fibres are able to freely move with respect to other fibres when a load, such as wind is applied thereto. This then results in the fibres rubbing across each other in normal use, making the material difficult to apply a printed graphic or pattern thereon. Any ink that is applied to the individual strands of the material is likely to be brushed away as the material moves in response to wind or another force such that overtime the printed graphic or pattern will fade away and lack definition thereon.

It will be appreciated that for containment systems applied on scaffolding about a building or other structure, there is an opportunity to use the surface to carry advertising or other graphics. This can improve the aesthetic appeal of the worksite and enable companies a further vehicle by which advertising can be displayed, such that construction sites and/or building owners can seek to raise revenue, even during traditional down time where repairs or construction works prevent access to the structure.

Thus, there is a need to provide a barrier material that can be used in containment systems which provides improved ability to retain a printed graphic or pattern over time and which can be simply printed on for use.

The above references to and descriptions of prior proposals or products are not intended to be, and are not to be construed as, statements or admissions of common general knowledge in the art. In particular, the above prior art discussion does not relate to what is commonly or well known by the person skilled in the art, but assists in the understanding of the inventive step of the present invention of which the identification of pertinent prior art proposals is but one part.

STATEMENT OF INVENTION

The invention according to one or more aspects is as defined in the independent claims. Some optional and/or preferred features of the invention are defined in the dependent claims.

According to a first aspect, the present invention provides a barrier material for a containment system comprising: a first portion of polymeric material having an open structure defined by a plurality of small openings to function as a fine screen, the first portion of polymeric material being formed from a plurality of fibrous materials and being configured to form a static structure having a display surface; and a second portion attached to a second surface of the first portion, the second portion having an open structure defined by a plurality openings to function as a reinforcing member for the first portion; wherein the display surface of the first portion is configured to receive and retain a printed image thereon.

In one embodiment, the first portion comprises three layers of polymeric material, a first layer comprising a plurality of warps extending in a first direction, a second layer comprising a plurality of wefts extending in a direction transverse to the first direction and a third layer comprising individual fibres arranged in a diagonal lattice across the first and second layers.

The first and second layers may be attached together at points where the warps and wefts intersect. The first, second and third layers may be encapsulated within a polymeric material to form said static structure. The polymeric material may be a PVC material.

The display surface of the first portion may be adjacent the encapsulated third layer of the first portion.

The second portion may comprises a grid formed from a plurality of transverse extending flexible supports and the plurality of wide openings are formed by the grid. The plurality of transverse extending flexible supports may each be connected at their intersection points to form said grid.

The first portion may be attached to said second portion by the first portion being sized to fold around the second portion to form a hem around the periphery of the second portion and wherein the hem is heat treated to be weld bonded to the second portion.

Reference throughout this specification to 'one embodiment' or 'an embodiment' means that a particular feature, structure or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristic described herein may be combined in any suitable manner in one or more combinations.

BRIEF DESCRIPTION OF THE DRAWINGS

The invention may be better understood from the following non-limiting description of preferred embodiments, in which.

DETAILED DESCRIPTION OF THE DRAWINGS

Preferred features of the present invention will now be described with particular reference to the accompanying drawings. However, it is to be understood that the features illustrated in and described with reference to the drawings are not to be construed as limiting on the scope of the invention.

The barrier material of the present invention will be described below in relation to its use and application as part of a containment system in a scaffolding application. However, it will be appreciated that the barrier material of the present invention could be equally employed in any number of containment systems applications as would be appreciated by those skilled in the art.

Figure 1:
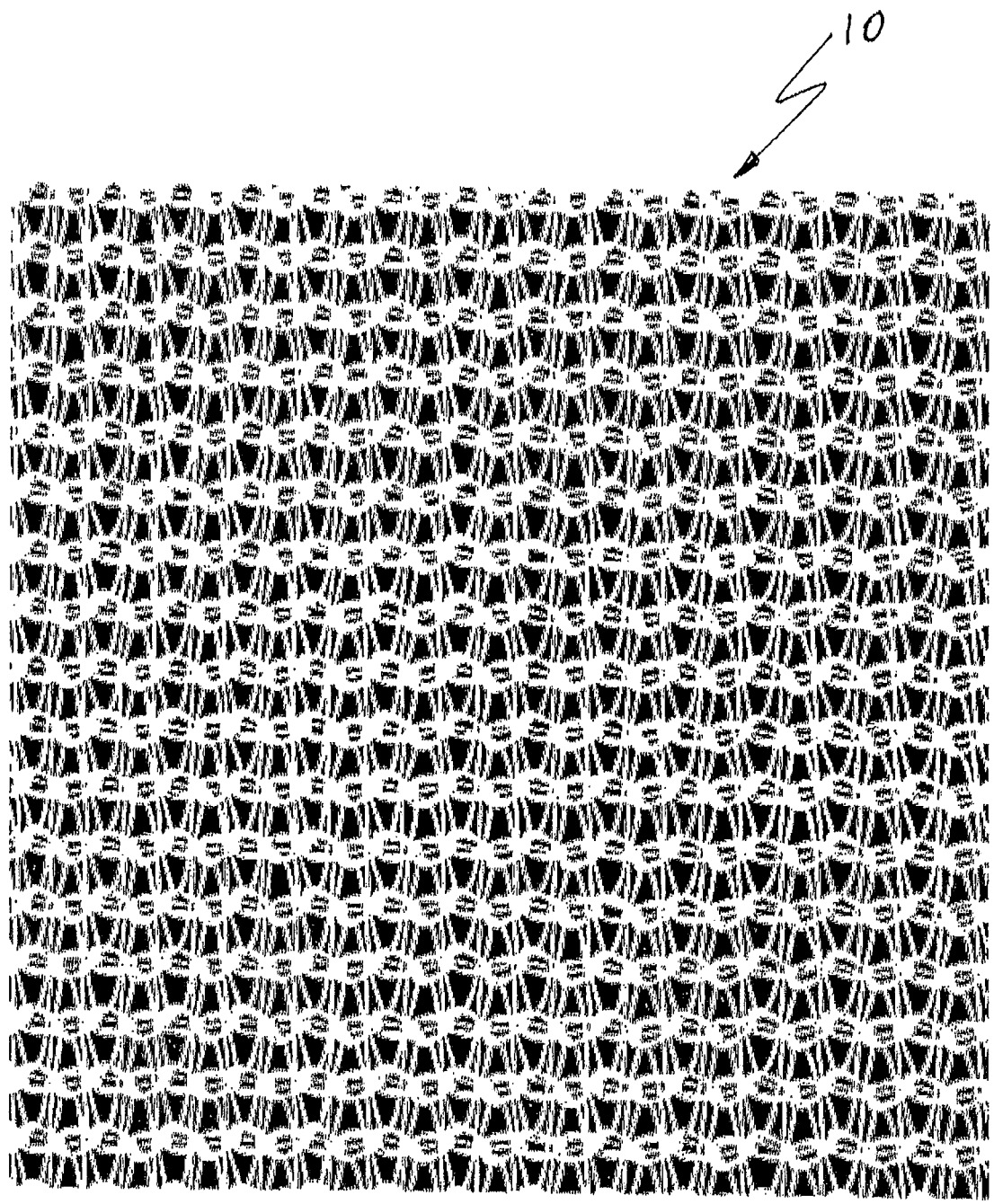
FIG. 1 is a plan view of a conventional netting material used in prior art containments systems.
Figure 2:
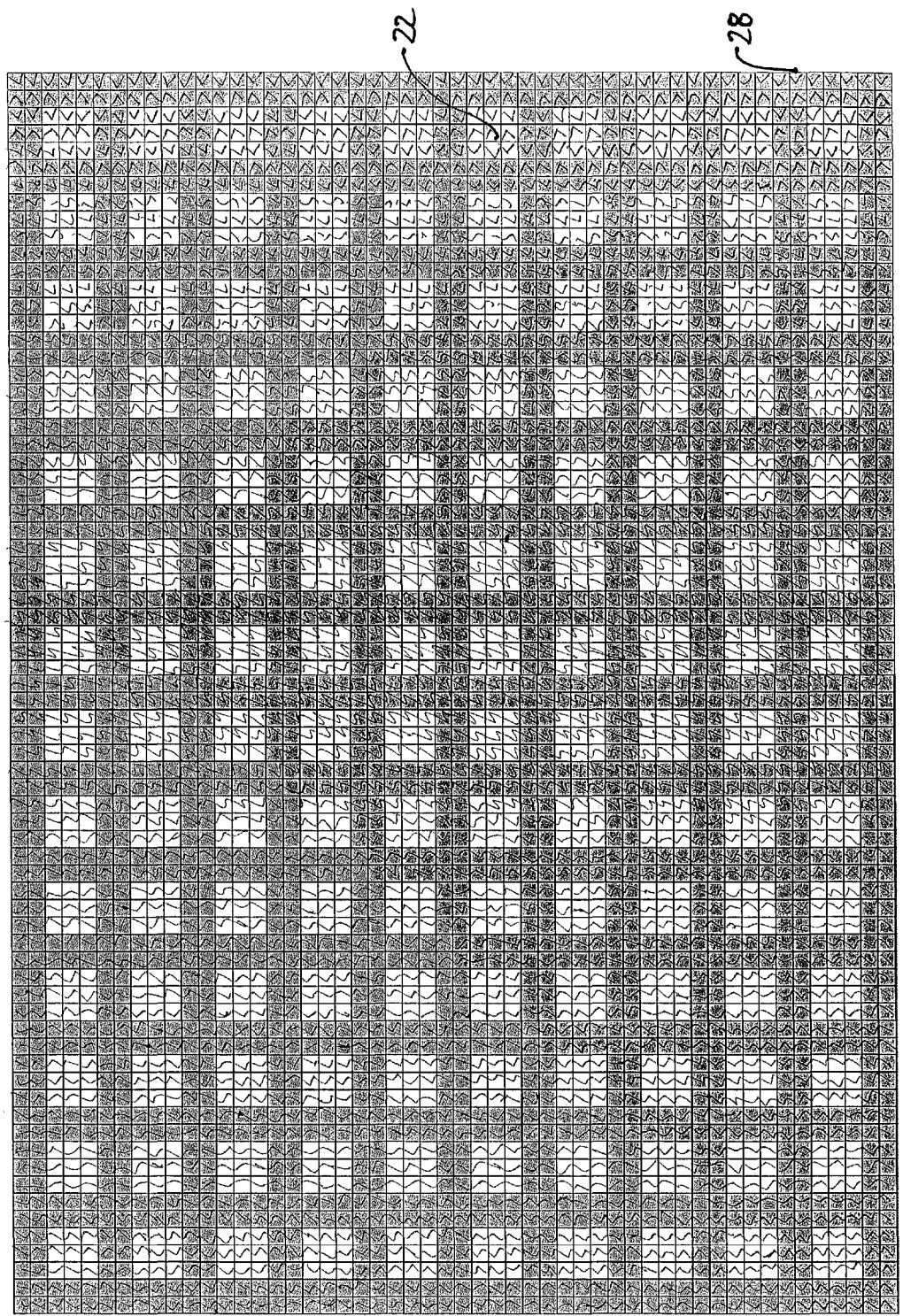
FIG. 2 is a plan view of the barrier material in accordance with an embodiment of the present invention.

Referring to FIG. 1, a plan view of an open weave netting material or shade cloth material 10 is depicted, which is typical of materials used in prior art containment systems.

The material comprises individual strands of polymeric material interwoven or knitted to form a material having vertically extending warps and horizontally extending wefts interweaved into a three dimensional structure. The dark regions represent open space between the individual strands of material, and the material is formed to facilitate individual movements between adjacent strands as a force is applied thereto, which may be as a result of a physical force applied to the material or wind passing through the material.

It will be appreciated that due to the nature of the material 10, if a pattern or graphic was applied to the surface of the material by way of a printing technique, such as spraying, the ink would adhere to those individual strands located at the surface of the material 10. Depending on the nature of the graphic or pattern to be printed on the material 10, as the material is employed on a construction site or the like, the strands of the material will be in constant movement, due to the wind passing through the material or any knocks or contact that may be made to the surface of the material. As the strands move across each other they will apply friction forces to the other strands which will cause any ink present on the strands to be stripped from the surface thereof. Overtime, the graphic or pattern applied to the surface of the material 10 will significantly fade such that it will lose its appeal and become so faint as to be indiscernible. If the material 10 is to be used with another backing material, such as a wire/plastic reinforcement grid, the presence of such a backing material may cause additional movement to the material 10, especially in the presence of clips or other attachment means.

FIGS. 2, 4, 5 and 6 depict a barrier material 20 in accordance with an embodiment of the present invention. As depicted, the barrier material 20 comprises two essential layers, a first or outer layer 22 that comprises an open structure, which is mounted onto a second or backing layer 28 to reinforce and support the outer layer 22.

Figure 3:
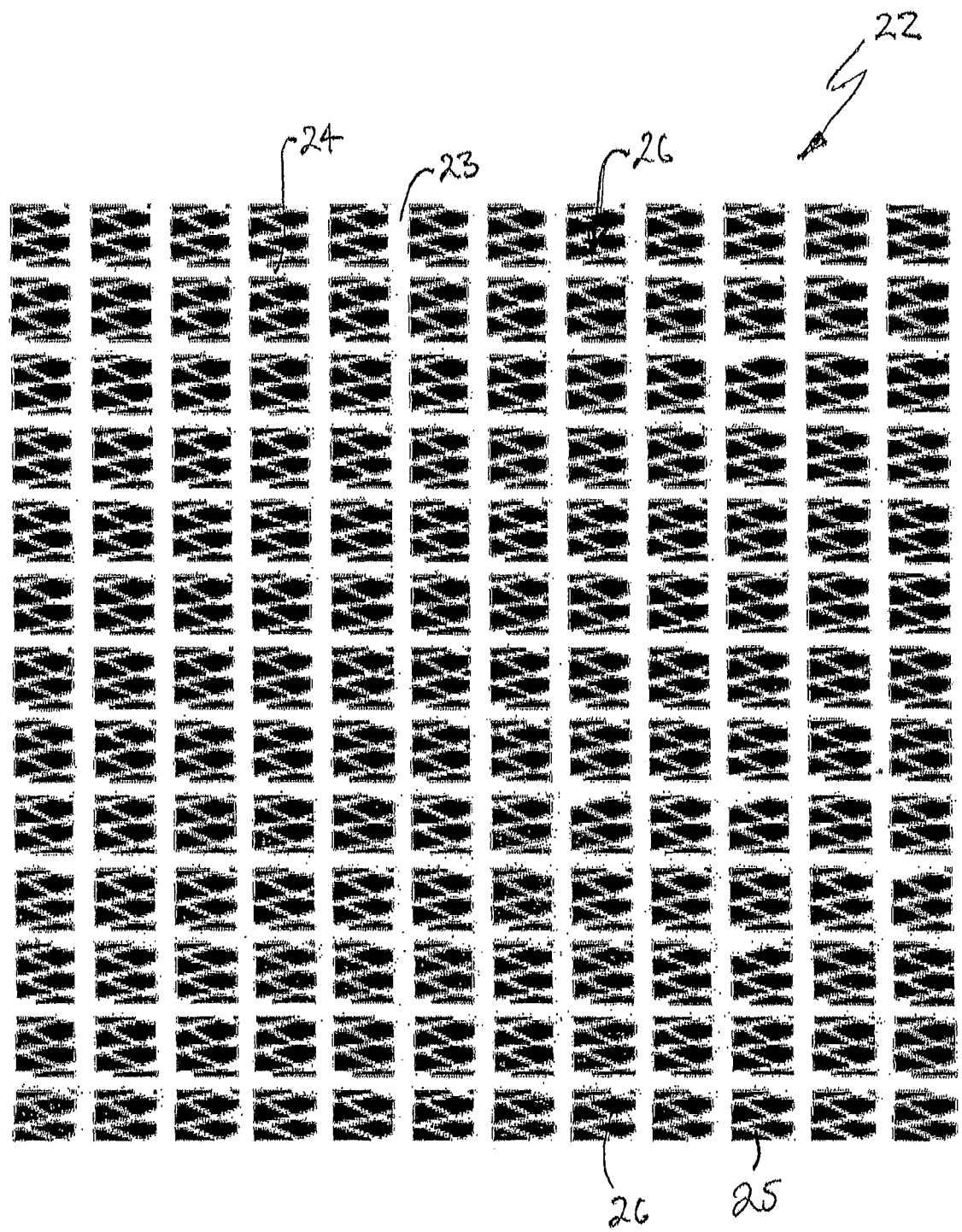
FIG. 3 is a plan view of the first or outer layer of the barrier material of FIG. 2.

An enlarged depiction of the first or outer layer 22 is shown in FIG. 3. The outer layer 22 generally consist of three layers. A first layer comprises a plurality of warps 23 arranged in a plurality of parallel rows. A second layer comprising a plurality of wefts 24 arranged in a plurality of parallel rows is then placed over the warps 23 to form a grid structure as depicted. As the warps 23 and the wefts 24 are arranged in transverse parallel rows, the resultant grid structure forms a plurality of open rectangular regions 26. The layer of warps 23 are attached to the layer of wefts 24 by micro-stitching at their intersections such that the two layers form a strong grid structure. Each of the warps 23 and wefts 24 are made from bundled fibres of plastic or polymeric material. A third layer is then provided atop the layer of wefts 24 in the form of strands of interwoven polymeric fibres which form a diagonal lattice structure across the open rectangular regions 26. This third layer of individual fibres functions to provide a material over the open rectangular regions 26 without greatly reducing the open nature of the combined material. The final step in processing the three layers to dip the combined layers into a PVC material such that the three layers are each covered in a PVC material and are bonded together to prevent movement of the layers across each other. This resulting outer or first layer 22 forms a substantially flat surface upon which a printed pattern or image can be received, whilst the structure of the layer 22 is still around 50% open to facilitate air permeation therethrough for reducing wind drag and has a combined weight of around 240 grams/m$^2$.

Figure 4:
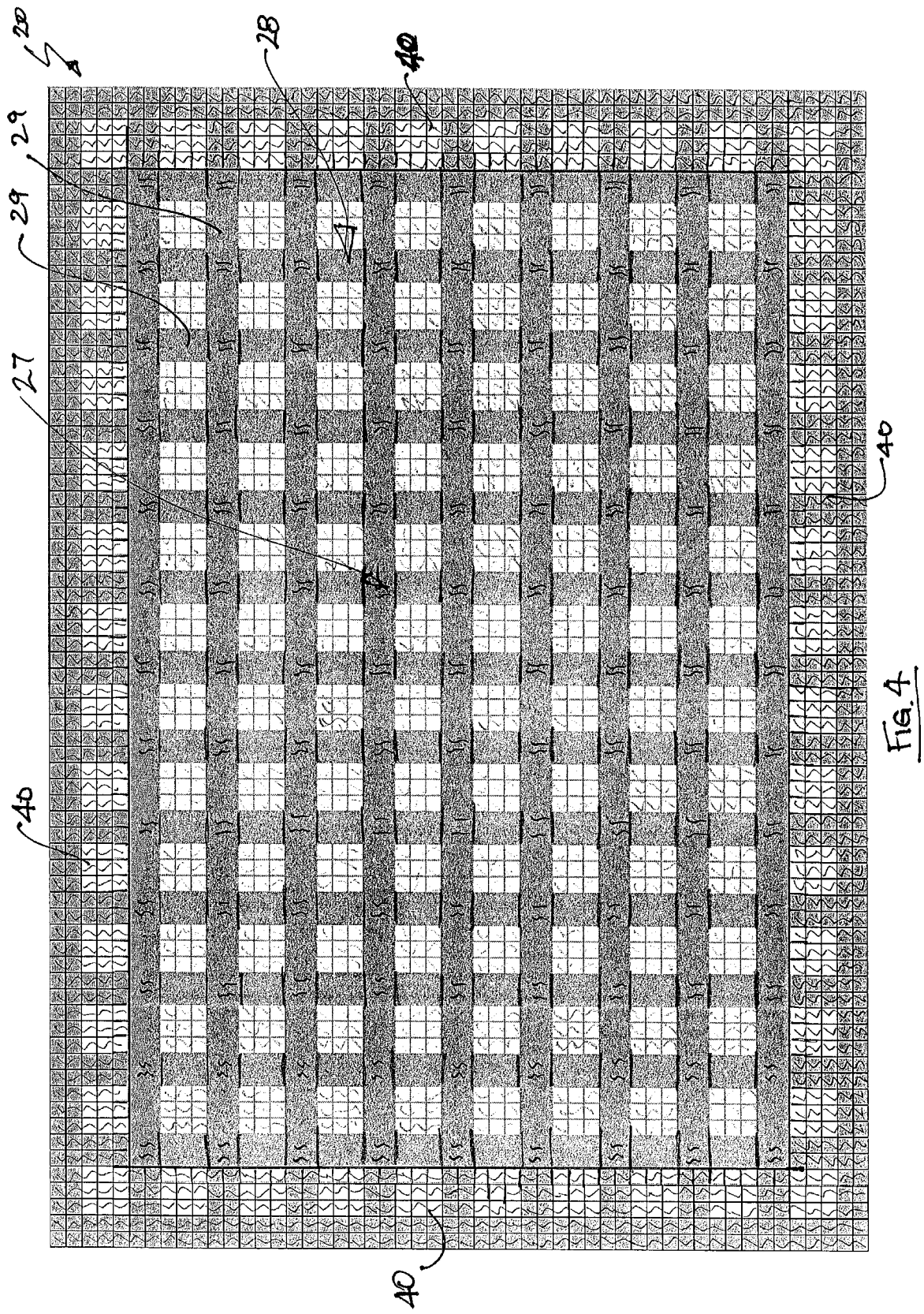
FIG. 4 is a rear view of the barrier material of FIG. 2.
Figure 5:
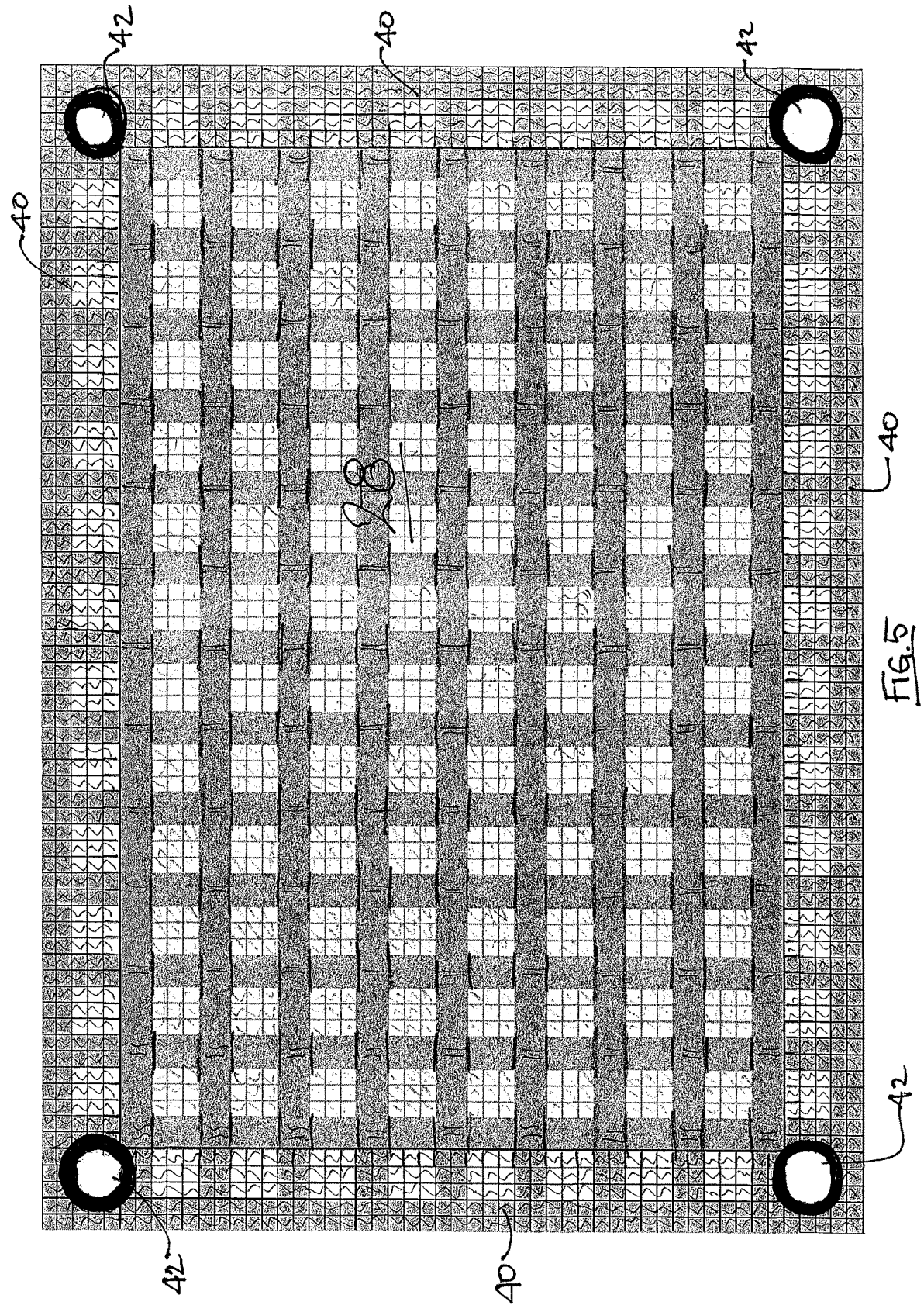
FIG. 5 is a rear view of the barrier material of FIG. 2 with the rivets installed.

Referring to FIG. 4, the second or backing layer 28 can be more readily seen. The backing layer comprises a grid 27 of flexible supports 29 extending traverse directions. Each of the flexible supports 29 are substantially flat and are arranged in two layers with the vertically extending supports 29 being the bottom layer and the horizontally extending supports 29 forming the top layer. The layers are each connected at the intersections of the supports 29 by way of stitching or similar attachment means. As the supports are all connected at the intersections the resultant grid 27 is significantly strong. Each of the supports 29 may be formed by a plurality of side-by-side straps of polymer strands such as nylon or any other suitable material. Each of the supports 29 may be separated by 10-20 mm, preferably around 15 mm, such that the resultant open grid 27 provides support to the first or outer layer 22 and enables the barrier material 20 the ability to be fixed in position. The backing layer 28 may also be formed from a material with a polyester core and a PET and/or PVC coating and the backing layer may have a weight of around 240 grams/m$^2$.

As can be seen in FIG. 4, the first or outer layer 22 is attached to the second or backing layer 28 by way of heat welding. The outer layer 22 is shaped to be oversized such that the periphery of the outer layer 22 folds behind the backing layer to form a hem portion 40 that extends around the periphery of the backing layer 28 in the manner as shown. Heat is then applied to the hem portion 40 which causes the hem portion 40 to bond to the supports 29 of the backing portion 28 as well as to the rear of the first or outer layer 22. To further secure the outer layer 22 to the backing layer 28, eyelets 42 are attached to each of the corners of the barrier material 20. The eyelets 42 are configured to be received in the open grid portions formed between the pairs or transverse extending supports 29 and are sealed pressed into position. The eyelets 42 also function as a means for attaching the barrier material 20 to the scaffolding or similar structure.

Figure 6:
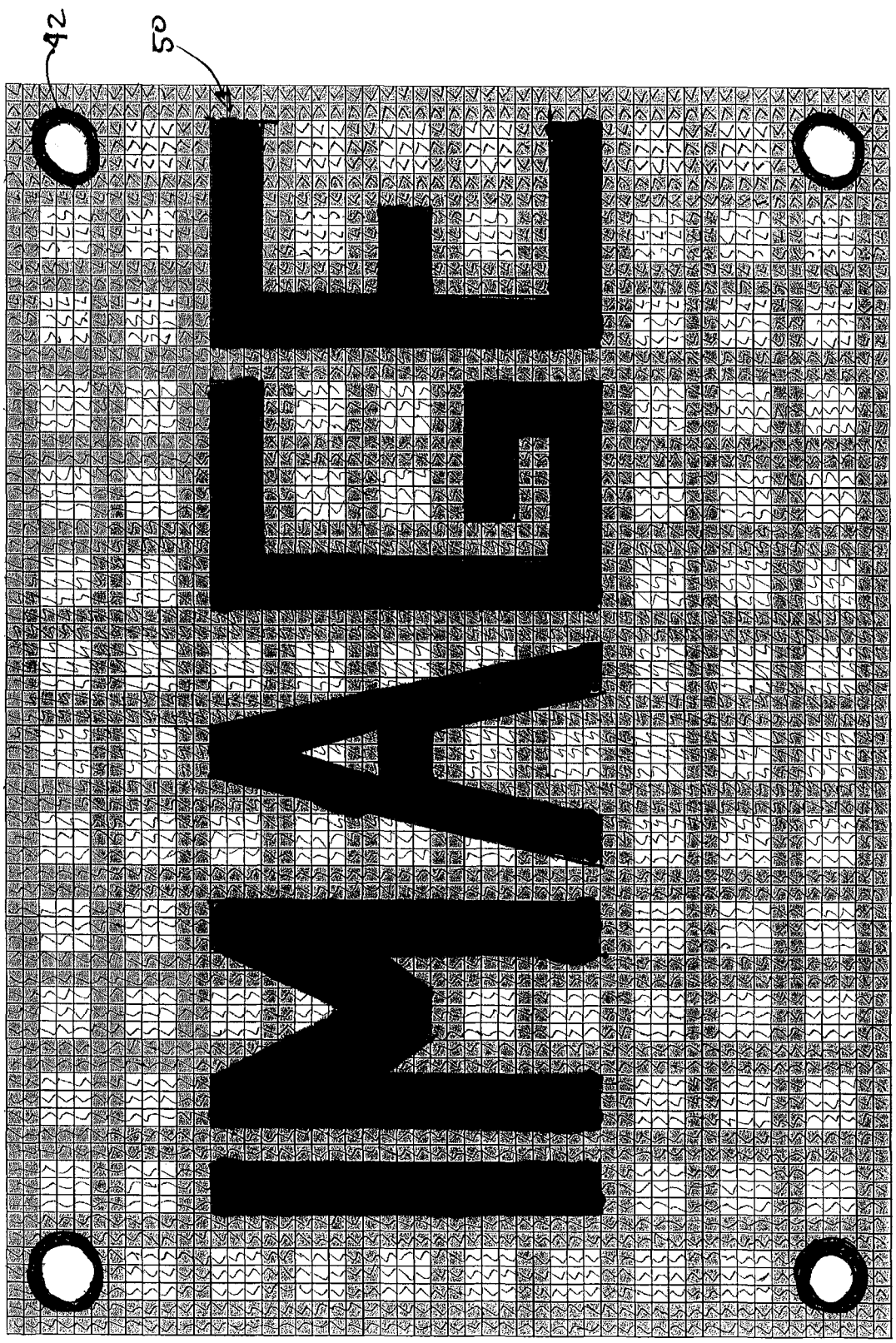
FIG. 6 is a front view of the barrier material of the present invention with image printed on the display surface thereof.

Referring to FIG. 6, due to the static nature of the outer layer 22, namely that the layers are attached together and coated to function as a single flat piece or material, an image, pattern, logo or other graphic 50 can be simply printed on the surface of the outer layer 22. This can be achieved through use of a conventional digital printer which can apply the image 50 directly onto the surface of the outer layer 22. Following printing, the barrier material 20 can be simply rolled up for storage or use. As each of the parts of the outer layer 22 are attached together and encapsulated within a plastic material, the parts are static and do not move independently during use. As such, the ink is not exposed to fibres in constant frictional engagement and is more likely to retain adhesion to the surface of the outer layer 22 and maintain the integrity of the image printed thereon over extended periods of time.

It will be appreciated that the construction of the barrier material of the present invention provides an improved surface for receiving a printed image and for retaining the integrity of the printed image over time. Such a material retains strength properties suitable to be used as a containment screen on scaffolding and the like, whilst also acting as a display surface for advertising or for displaying other images to improve the aesthetics of the building site.

Throughout the specification and claims the word "comprise" and its derivatives are intended to have an inclusive rather than exclusive meaning unless the contrary is expressly stated or the context requires otherwise. That is, the word "comprise" and its derivatives will be taken to indicate the inclusion of not only the listed components, steps or features that it directly references, but also other components, steps or features not specifically listed, unless the contrary is expressly stated or the context requires otherwise.

Orientational terms used in the specification and claims such as vertical, horizontal, top, bottom, upper and lower are to be interpreted as relational and are based on the premise that the component, item, article, apparatus, device or instrument will usually be considered in a particular orientation, typically with the barrier material uppermost.

It will be appreciated by those skilled in the art that many modifications and variations may be made to the methods of the invention described herein without departing from the spirit and scope of the invention.

The invention claimed is:

1. A barrier material for a containment system comprising:
   a first portion of polymeric material having an open structure defined by a plurality of small openings to function as a fine screen, the first portion of polymeric material being formed from a plurality of fibrous materials forming a static structure defining a display surface; and
   a second portion attached to a second surface of the first portion, the second portion having an open structure defined by a plurality of openings to function as a reinforcing member for the first portion;
   wherein the display surface of the first portion is configured to receive and retain a printed image thereon, and wherein the first portion comprises three layers of polymeric material, a first layer comprising a plurality of warps extending in a first direction, a second layer comprising a plurality of wefts extending in a direction transverse to the first direction and a third layer comprising individual fibres arranged in a diagonal lattice across a top of the first and second layers, and wherein the first, second, and third layers are encapsulated within a polymeric material to form said static structure.

2. A barrier material according to claim 1, wherein the first and second layers are attached together at points where the warps and wefts intersect.

3. A barrier material according to claim 1, wherein the polymeric material is a PVC material.

4. A barrier material according to claim 1, wherein the display surface is adjacent the encapsulated third layer of the first portion.

5. A barrier material according to claim 1, wherein the second portion comprises a grid formed from a plurality of transverse extending flexible supports and the plurality of wide openings are formed by the grid.

6. A barrier material according to claim 5, wherein the plurality of transverse extending flexible supports are each connected at their intersection points to form said grid.

7. A barrier material according to claim 6, wherein the first portion is attached to said second portion by the first portion being sized to fold around the second portion to form a hem around the periphery of the second portion and wherein the hem is heat treated to be weld bonded to the second portion.

* * * * *